United States Patent
Lyon

(10) Patent No.: US 10,625,623 B2
(45) Date of Patent: Apr. 21, 2020

(54) CHARGING ASSEMBLY WITH OVERRIDE MEMBER ON LOCKING DEVICE

(71) Applicant: TE CONNECTIVITY CORPORATION, Berwyn, PA (US)

(72) Inventor: Zachary Wood Lyon, Lewisville, NC (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 16/002,641

(22) Filed: Jun. 7, 2018

(65) Prior Publication Data

US 2019/0375300 A1    Dec. 12, 2019

(51) Int. Cl.
| | |
|---|---|
| H01R 13/62 | (2006.01) |
| B60L 53/16 | (2019.01) |
| H01R 13/627 | (2006.01) |
| H01R 13/635 | (2006.01) |
| H01R 13/639 | (2006.01) |

(52) U.S. Cl.
CPC .......... *B60L 53/16* (2019.02); *H01R 13/6278* (2013.01); *H01R 13/635* (2013.01); *H01R 13/639* (2013.01)

(58) Field of Classification Search
CPC ............................. H01R 33/97; H01R 13/6397
USPC ......................................... 439/302, 304, 352
See application file for complete search history.

(56) References Cited

U.S. PATENT DOCUMENTS

| | | | |
|---|---|---|---|
| 9,337,580 B2 | 5/2016 | Temmesfeld | |
| 2014/0170889 A1 | 6/2014 | Kahara et al. | |
| 2016/0280086 A1* | 9/2016 | Lopez | ................. B60L 11/1818 |
| 2017/0341524 A1 | 11/2017 | Heiss et al. | |

FOREIGN PATENT DOCUMENTS

WO    2011142164 A1    11/2011

OTHER PUBLICATIONS

International Search Report, International Application No. PCT/IB2019/053999, International Filing Date, May 14, 2019.

* cited by examiner

*Primary Examiner* — Phuong K Dinh

(57) ABSTRACT

A charging assembly includes a charging inlet and a locking device mounted to the charging inlet. The locking device includes a housing, a release member, and an override member. The release member is connected to a movable locking pin via a mechanical linkage. The locking pin in an extended position is configured to secure a mating connector of an external power source to the charging inlet. The override member is slidably mounted to the housing, and includes a tail that is coupled to the release member. The override member has a contact surface configured to be engaged by an external instrument to translate the override member relative to the housing such that the tail actuates the release member causing the locking pin to transition from the extended position towards a retracted position to enable the mating connector to be disconnected from the charging inlet.

20 Claims, 5 Drawing Sheets

CHARGING ASSEMBLY WITH OVERRIDE MEMBER ON LOCKING DEVICE

BACKGROUND

The subject matter herein relates generally to electrical charging assemblies with locking devices for locking an electrical connection, and more particularly, to a charging assembly for locking a mating connector to a charging inlet of a vehicle.

Known electrical connections with a high voltage applied or high currents to be transmitted are capable of being locked, or secured against disconnection. Such locking avoids arcing and consequent damage of connection components, avoids potential injury, and guards against premature disconnection before a battery achieves a designated level of charge.

Electric vehicles, including fully electric and plug-in hybrid vehicles, establish an electrical connection during charging only if a plug connector of the charging station is securely and completely plugged into a charging inlet of the vehicle. Electric vehicles have known locking devices on the charging inlet or the plug connector of the charging station. The locking devices have a locking member which is movable from an unlock position to a lock position. When the locking member is in the unlock position, the charging inlet and the plug connector of the charging station are able to be mated to each other and disconnected. When the charging inlet and the plug connector are mated and the locking member is in the lock position, the charging inlet and the plug connector are positively locked and may not be disconnected or unplugged. The locking member must be actuated to the unlock position to disconnect the plug connector from the charging inlet of the vehicle.

The locking member of known locking devices may unintentionally stick, freeze, or jam in the lock position due to various causes. Some potential causes for a stuck locking member include a dead battery that prevents an electrical actuator from receiving electric current to move the locking member, an inoperable electrical actuator caused by damage to a motor or a solenoid in the electrical actuator, and jammed or broken gears in a mechanical linkage of the locking device. In order to unlock the plug connector from the charging port in such situations, some known locking devices have mechanical override mechanisms that include a long cable routed from the locking device through the vehicle to a handle that is accessible by an occupant of the vehicle. The occupant actuates the handle to apply tension on the cable, which transitions the locking pin to the unlock position via a mechanical linkage in the locking device. Such mechanical override mechanisms may be complex and costly due to the routing of the cable through various sections of the vehicle and the installation of a specific handle.

A need remains for a charging assembly with a mechanical override for a locking device that is less complex and costly than known mechanical override mechanisms.

SUMMARY

In one or more embodiments of the present disclosure, a charging assembly is provided that includes a charging inlet and a locking device. The charging inlet is configured to releasably couple to a mating connector of an external power source to recharge a battery. The locking device is mounted to the charging inlet, and includes a housing, a release member, and an override member. The release member is mounted to the housing and connected to a locking pin via a mechanical linkage. The locking pin is movable between an extended position and a retracted position. The locking pin in the extended position is configured to secure the mating connector to the charging inlet. The override member is slidably mounted to the housing. The override member has a body and a tail that extends from the body. The tail is coupled to the release member. The body has a contact surface configured to be engaged by an external instrument to translate the override member relative to the housing such that the tail actuates the release member causing the locking pin to transition from the extended position towards the retracted position to enable the mating connector to be disconnected from the charging inlet.

In one or more embodiments of the present disclosure, a locking device is provided that includes a housing, a release member, an electrical actuator, and an override member. The release member is mounted to the housing and is connected to a locking pin via a mechanical linkage. The locking pin is movable between an extended position and a retracted position. The electrical actuator is connected to the locking pin and is configured to move the locking pin between the extended and retracted positions based on electrical control signals. The override member is slidably mounted to the housing. The override member has a body and a tail that extends from the body. The tail is coupled to the release member. The body has a contact surface configured to be engaged by an external instrument to translate the override member relative to the housing along a longitudinal axis such that the tail actuates the release member causing the locking pin to transition from the extended position towards the retracted position, overriding the electrical actuator.

In one or more embodiments of the present disclosure, a charging assembly is provided that includes a panel, a charging inlet, and a locking device. The panel defines an access port. The charging inlet is configured to releasably couple to a mating connector of an external power source to recharge a battery of a vehicle. The charging inlet is mounted to the vehicle along an interior of the panel. The locking device is mounted to the charging inlet interior of the panel. The locking device includes a release member and an override member. The release member is connected to a locking pin via a mechanical linkage. The locking pin is movable between an extended position and a retracted position. The locking pin in the extended position is configured to secure the mating connector to the charging inlet. The override member has a body and a tail that extends from the body. The tail is coupled to the release member. The body has a contact surface that aligns with the access port in the panel and is configured to be engaged by an external instrument from an exterior of the panel by insertion of the external instrument through the access port. Due to the engagement by the external instrument on the contact surface, the override member is configured to translate relative to the charging inlet such that the tail actuates the release member causing the locking pin to transition from the extended position towards the retracted position to enable the mating connector to be disconnected from the charging inlet.

DETAILED DESCRIPTION

Figure 1:
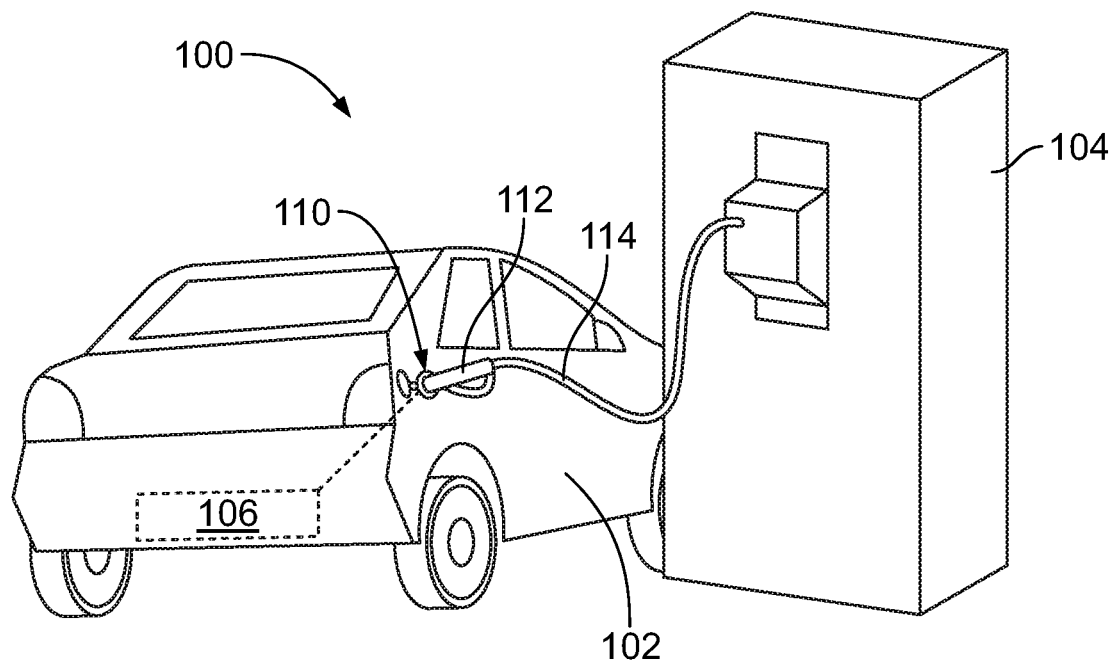
FIG. 1 illustrates a charging system that includes an electric vehicle and a charging station according to an embodiment.

FIG. 1 illustrates a charging system 100 that includes an electric vehicle 102 and a charging station 104 according to an embodiment. The electrical vehicle 102 may be a fully electric vehicle that includes a battery 106 and lacks a combustion engine, a plug-in hybrid that includes both the battery 106 and a combustion engine, or the like. The battery 106 is a traction battery that provides electrical power to a traction motor (not shown) that generates tractive effort to the drivetrain and wheels for propelling the vehicle 102. Optionally, the traction motor may be selectively functional as a generator when tractive effort is not desired, such as when driving downhill, to generate electrical energy for charging the battery 106 using regenerative braking. Although a single battery 106 is shown and described, it is recognized that the battery 106 may represent an array of batteries and/or battery cells.

Figure 2:
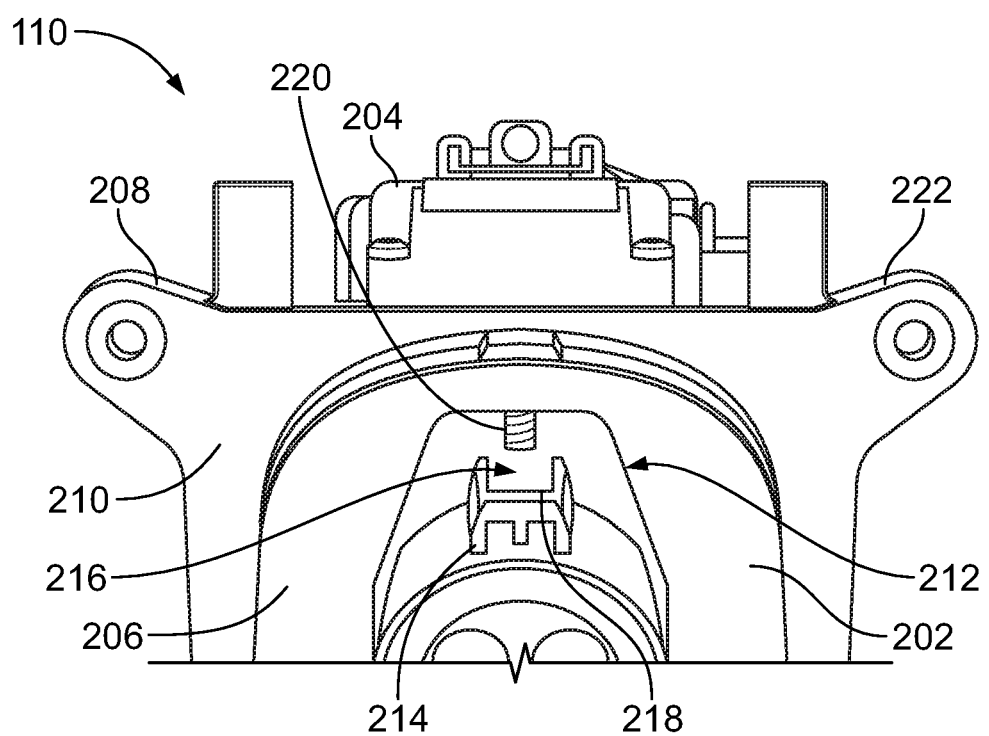
FIG. 2 is a front perspective view of a portion of a charging assembly according to an embodiment.

The vehicle 102 includes a charging assembly 110 onboard the vehicle 102 that is configured to connect with a mating connector 112 of an external power source to recharge the battery 106. In the illustrated embodiment, the charging station 104 represents the external power source. Some external power sources other than the charging station 104 that may be used to connect with the charging assembly 110 to recharge the battery 106 include home electrical outlets, external generators, and the like. The mating connector 112 is a plug connector that is coupled to the charging station 104 via an electrical power cable 114. As described herein, the charging assembly 110 of the vehicle 102 includes at least a charging inlet 202 (shown in FIG. 2) and a locking device 204 (FIG. 2). The charging inlet 202 has a mating interface that releasably couples directly to the mating connector 112 to establish an electrical connection to conduct current from the charging station 104 to the battery 106. The locking device 204 releasably secures the mating connector 112 to the charging inlet 202 to prevent premature disconnection of the mating connection 112 from the charging inlet 202.

FIG. 2 is a front perspective view of a portion of the charging assembly 110 according to an embodiment. The charging assembly 110 in the illustrated embodiment includes the charging inlet 202 and the locking device 204. The charging inlet 202 is a structural connector that includes a mating interface 206 configured to engage the mating connector 112 (FIG. 1) of the external power source (e.g., the charging station 104). The charging inlet 202 may also include a mounting flange 208 with defined apertures 209.

The apertures 209 receive fasteners (not shown) therethrough to mount the charging inlet 202 to a structure of the vehicle 102, such as a chassis or the like. The mating interface 206 projects from a front side 210 of the mounting flange 208. The mating interface 206 has a specific profile and form factor for engaging complementary structures of the mating connector 112. For example, the mating interface 206 defines an upper cavity 212 that is configured to receive a distal end of the mating connector 112 therein. The mating interface 206 includes a catch structure 214 within the upper cavity 212. The catch structure 214 defines a depression 216 behind a catch wall 218. During the mating process, a latch member (not shown) at the distal end of the mating connector 112 deflects or is lifted over the catch wall 218 and is received into the depression 216. The latch member hooks onto a back surface of the catch wall 218 to secure the mating connector 112 to the charging inlet 202.

As shown in FIG. 2, a locking pin 220 projects into the upper cavity 212 of the mating interface 206 and is disposed above the catch structure 214. The locking pin 220 is configured to be movable between an extended position and a retracted position. The locking pin 220 projects a greater distance into the upper cavity 212 when in the extended position relative to the retracted position. The locking pin 220 is in the extended position in FIG. 2. The locking pin 220 optionally may not extend into the upper cavity 212 at all when in the retracted position, or may extend into the upper cavity 212 a reduced distance relative to when the locking pin 220 is in the extended position.

In an embodiment, the locking pin 220 in the extended position is configured to lock the mating connector 112 to the charging inlet 202. For example, the locking pin 220 may extend into a retreat path of the latch member of the mating connector 112, blocking the latch member from unhooking from the back surface of the catch wall 218 and exiting the depression 216. When the locking pin 220 is in the retracted position, the pin 220 does not lock the mating connector 112 to the charging inlet 202, such that the pin 220 does not block the latch member from exiting the depression 216. For example, when the mating connector 112 is mated to the charging inlet 202, the locking pin 220 transitioning from the extended position to the retracted position effectively releases or unlocks the mating connector 112. When the locking pin 220 is in the retracted position, the mating connector 112 is freely mated and unmated from the charging inlet 202 by actuating the latch member.

The locking device 204 controls the positioning of the locking pin 220. The locking pin 220 may be a component of the locking device 204, or may be a component of the charging inlet 202 that is operably connected to the locking device 204. The locking device 204 is mounted to the charging inlet 202. In an embodiment, the locking device 204 is mounted to the charging inlet 202 behind a rear side 222 of the mounting flange 208 that is opposite the front side 210.

Figure 3:
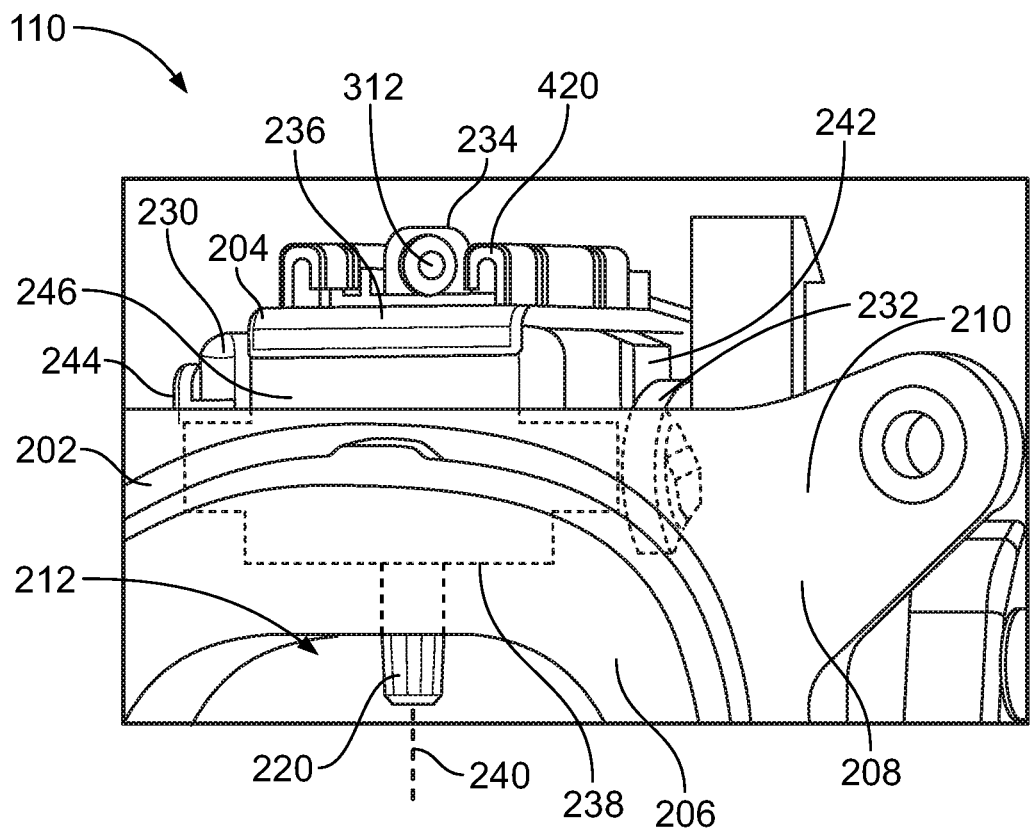
FIG. 3 illustrates a close-up view of a portion of the charging assembly according to an embodiment.

FIG. 3 illustrates a close-up view of a portion of the charging assembly 110 according to an embodiment. In FIG. 3, the portions of the locking device 204 obstructed by the mounting flange 208 and the mating interface 206 of the charging inlet 202 are shown in phantom. The locking device 204 includes various components, including a housing 230, a release member 232, and an override member 234. The housing 230 of the locking device 204 has an outer side 236 and an inner side 238 that is opposite the outer side 236. The inner side 238 faces radially inward towards the charging inlet 202. The outer side 236 faces away from the charging inlet 202. The inner side 238 may sit on and engage the charging inlet 202.

In the illustrated embodiment, the locking pin 220 may be held by the housing 230 and may project beyond the inner side 238 of the housing 230 when in the extended position. For example, the locking pin 220 in the extended position may protrude through an opening (not shown) in the mating interface 206 and into the upper cavity 212. The locking pin 220 may be bi-directionally movable along a pin axis 240 between the extended and retracted positions. The pin axis 240 may be perpendicular to a mating axis (not shown) along which the mating connector 112 mates to the charging inlet 202.

The override member 234 of the locking device 204 is movably mounted on the housing 230. In the illustrated embodiment, the override member 234 is slidably mounted on the outer side 236 of the housing 230. The release member 232 of the locking device 204 may also be mounted along an exterior of the housing 230. For example, in the illustrated embodiment, the release member 232 is mounted along a first edge side 242 of the housing 230. The housing 230 has the first edge side 242 and a second edge side 244 that is opposite the first edge side 242. The first and second edge sides 242, 244 extend from the inner side 238 to the outer side 236. The housing 230 also includes a front side 246 and a rear side 248 (shown in FIG. 6) that is opposite the front side 246. The front side 246 faces in a direction towards the mating connector 112 (e.g., the same direction as that the front side 210 of the mounting flange 208 faces). The front side 246 extends laterally between the first edge side 242 and the second edge side 244, and extends vertically between the inner side 238 and the outer side 236. As used herein, relative or spatial terms such as "upper," "lower," "inner," "outer," "front," and "rear" are only used to identify and distinguish the referenced elements in the illustrated figures and do not necessarily require particular positions or orientations relative to gravity and/or the surrounding environment of the charging assembly 110.

Figure 4:
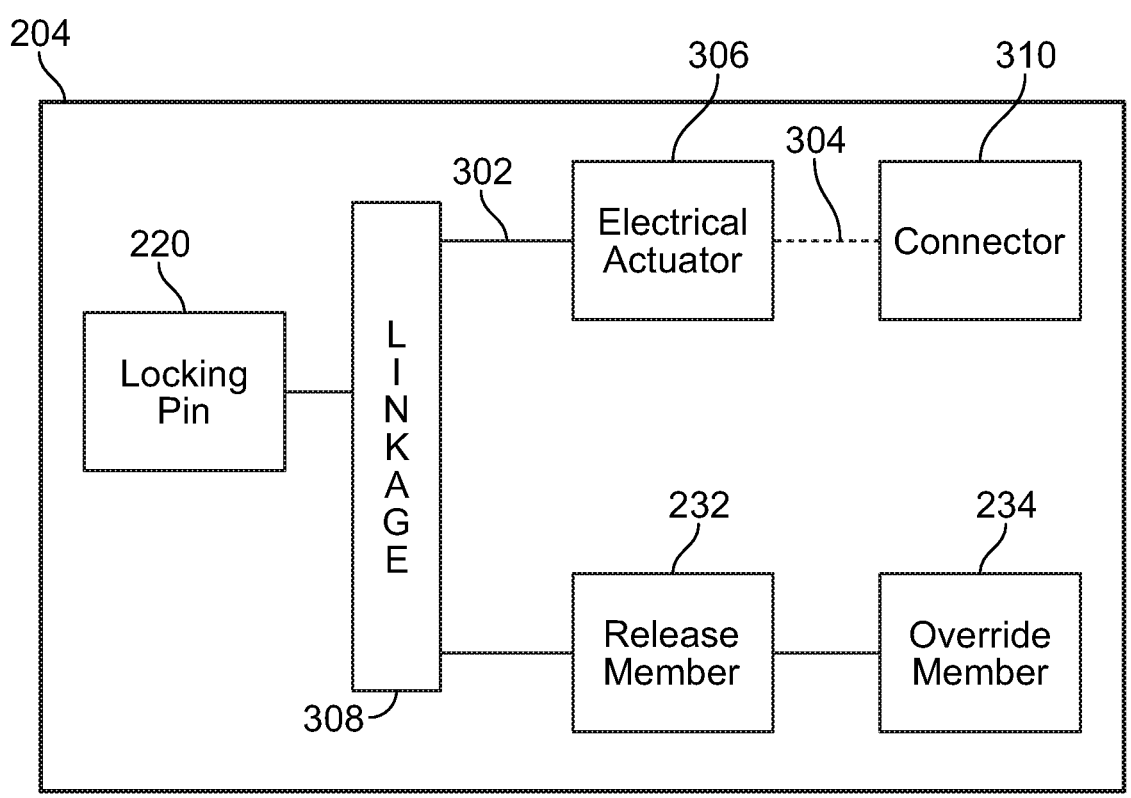
FIG. 4 is a schematic block diagram of a locking device of the charging assembly according to an embodiment.

FIG. 4 is a schematic block diagram of the locking device 204 according to an embodiment. In the illustrated embodiment, various components of the locking device 204 are schematically represented as a boxes or blocks. The divisions between blocks in FIG. 4 are not necessarily representative of physical separations between components, as some of the components may be integrated together. The solid lines 302 connecting components in FIG. 4 indicate mechanical connections, and the dashed line 304 represents an electrical connection.

The locking device 204 includes the locking pin 220, the release member 232, the override member 234, an electrical actuator 306, a mechanical linkage 308, and an electrical connector 310. The electrical actuator 306 is mechanically connected to the locking pin 220 via the mechanical linkage 308. The mechanical linkage 308 may include hardware that is configured to convert mechanical movement of the electrical actuator 306 into movement of the locking pin 220 along the pin axis 240 between the extended and retracted positions. The mechanical linkage 308 may include multiple gears, such as a gearbox or gear train having racks, pinion gears, bevel gears, and/or the like. The mechanical linkage 308 may include one or more shafts, ratchets, cams, springs, latches, and/or the like in addition to (or instead of) the gears.

The electrical actuator 306 is configured to convert electrical energy into mechanical energy to move the locking pin 220. The electrical actuator 306 is electrically connected to the electrical connector 310 via a conductive path 304 defined by one or more wires or cables. The electrical actuator 306 may represent or include a solenoid, an electric motor, or another electromagnetic device. The electrical actuator 306 may receive electrical power and/or control signals through the electrical connector 310. In a non-limiting example, the actuator 306 may be configured to transition the locking pin 220, via the mechanical linkage 308, between the extended position and the retracted position in response to receiving a first control signal (or an energization signal). The actuator 306 may be configured to maintain the current position of the locking pin 220 after receiving the first control signal for a length of time until the actuator 306 receives a second control signal. Thus, the actuator 306 may transition the locking pin 220 responsive to each control signal received. In an alternative embodiment, the actuator 306 may transition the locking pin 220 upon receipt of an extended control signal (e.g., energization), and may reverse the locking pin 220 upon termination of the control signal (e.g., when de-energized).

The release member 232 is mechanically connected to the locking pin 220 via the mechanical linkage 308. Although FIG. 4 only shows a single box representing the mechanical linkage 308, it is recognized that the mechanical linkage between the release member 232 and the locking pin 220 may be the same or different from the mechanical linkage between the actuator 306 and the locking pin 220. The release member 232 is directly mechanically coupled to the override member 234. The release member 232 and the override member 234 represent components of a mechanical override system for transitioning the locking pin 220 from the extended position towards the retracted position. The release member 232 may be a lever, a strap, a pivot arm, or the like, that is actuatable by pivoting, rotating, translating, or the like relative to the housing 230. The movement of the release member 232 causes the linkage 308 to transition the locking pin 220 towards the retracted position.

In a non-limiting example, the release member 232 may be connected to a locking element within the linkage 308, such as a cam or a ratchet, which secures the linkage 308 in a designated position. The locking pin 220 may be separately biased towards the retracted position via a biasing element, such as a spring. The actuation of the release member 232 may release the locking element, such as the cam or ratchet, allowing the biasing element to retract the locking pin 220.

The override member 234 is a mechanical structure that is coupled to the release member 232 and is configured to actuate the release member 232. For example, the override member 234 is configured to be moved relative to the housing 230 by an external instrument. The external instrument may be handled by a person or a robot. The external instrument may be an elongated object, such as a screwdriver, an Allen wrench, or the like. For example, the override member 234 defines a contact surface 312, shown in FIG. 3, that is sized and shaped to accommodate and engage the external instrument. The contact surface 312 may include a concavity for receiving a tip of the external instrument. The movement of the override member 234 actuates the release member 232.

The release member 232 and the override member 234 of the locking device 204 may override the electrical actuator 306 when the actuator 306 is inoperable. For example, in normal operation the electrical actuator 306 is utilized to retract the locking pin 220 to release the mating connector 112 (FIG. 1) from the charging inlet 202. But, when the electrical actuator 306 is inoperable that actuator 306 is not able to retract the locking pin 220. The actuator 306 may be inoperable due to various causes, such as a dead battery or other electrical power issue that prevents the transmission of electrical current to the actuator 306, damaged internal components within the actuator 306 (e.g., burned out motor or solenoid), jamming in the mechanical linkage 308, or the like. When the actuator 306 is unable to retract the locking pin 220, the mechanical override system is utilized to manually retract the pin 220. For example, the movement of the override member 234 actuates the release member 232. The actuation of the release member 232 may release the cam, ratchet, or other locking element holding the pin 220 in the extended position, as described above, to enable the pin 220 to retract towards the retracted position.

Figure 5:
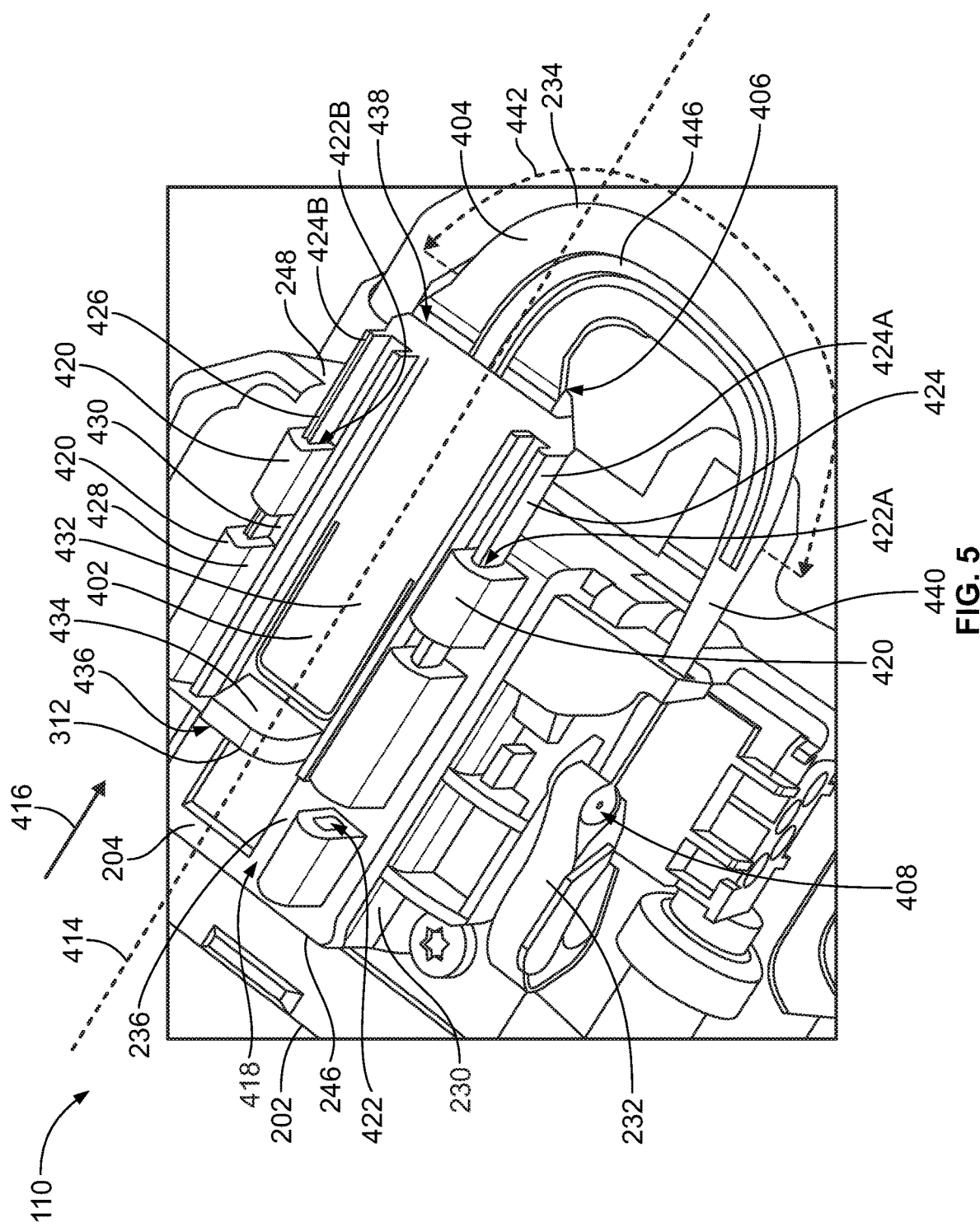
FIG. 5 is a top perspective view of the charging assembly showing an override member of the locking device according to an embodiment.

FIG. 5 is a top perspective view of the charging assembly 110 showing the override member 234 on the locking device 204 according to an embodiment. The override member 234 has a body 402 and a tail 404 that extends from the body 402. The tail 404 has a proximal end 406 at the body 402 and a distal end 408 opposite the proximal end 406. The distal end 408 is spaced apart from the body 402. The tail 404 is mechanically coupled to the release member 232. In the illustrated embodiment, the distal end 408 of the tail 404 is coupled to the release member 232. The contact surface 312 of the override member 234, is configured to be engaged by an external instrument, is a part of the body 402. In an embodiment, the engagement of the contact surface 312 by the external instrument may cause the override member 234 to translate relative to the housing 230 such that the tail 404 actuates the release member 232. As described above, the actuation of the release member 232 may mechanically override the electrical actuator 306 and cause the locking pin 220 to transition towards the retracted position, allowing the mating connector 112 (FIG. 1) to be disconnected from the charging inlet 202 (FIG. 2).

The override member 234 in at least one embodiment bi-directionally is translatable relative to the housing 230 along a longitudinal axis 414. The longitudinal axis 414 may be parallel to the mating axis (not shown) along which the mating connector 112 mates to the charging inlet 202, and perpendicular to the pin axis 240 along which the locking pin 220 moves. The override member 234 may slide along the longitudinal axis 414 between an initial resting position and a displaced position. In FIG. 5, the override member 234 is shown at or proximate to the displaced position. In an embodiment, the override member 234 is biased towards the resting position, and the external instrument is used to move the override member 234 towards the displaced position. The release member 232 may bias the override member 234 towards the resting position by forcing the tail 404 towards the resting position. Although the resting position is not shown, the body 402 is located closer to the front side 246 of the housing 230 when in the resting position than when in the displaced position as shown. Thus, the external instrument is configured to push the override member 234 in an actuation direction 416 along the longitudinal axis 414 from the resting position to the displaced position.

The override member 234 is held on the outer side 236 of the housing 230 within a track 418 defined between guide features 420. The guide features 420 are raised components of the housing 230 that project beyond the outer side 236 and define guide channels 422 for receiving elongated edges 424 of the body 402 of the override member 234. For example, a first elongated edge 424A of the body 402 is received within a first guide channel 422A, and a second elongated edge 424B of the body 402 opposite the first elongated edge 424A is received within a second guide channel 422B. The guide features 420 restrict side-to-side movement of the body 402, tilt, and outward movement of the body 402 away from the outer side 236, limiting the movement of the body 402 to bi-directional translation along the longitudinal axis 414. In the illustrated embodiment, the body 402 optionally includes a raised lip 426 at each of the first and second elongated edges 424A, 424B. The raised lips 426 are received within the guide channels 422A, 422B. The guide features 420 include hook tips 428 that extend along and engage interior surfaces 430 of the raised lips 426 that face towards a longitudinal centerline of the body 402.

In the illustrated embodiment, the body 402 of the override member 234 includes a base 432 and a head 434 that extends upright from the base 432. The head 434 defines the contact surface 312 (shown in more detail in FIG. 3). The base 432 may be a relatively thin and planar member that defines the first and second elongated edges 424A, 424B of the body 402. The base 432 may engage and slide along the outer side 236 of the housing 230. The head 434 projects outward from the base 432.

The body 402 has a front end 436 and a rear end 438 opposite the front end. The head 434, and the contact surface 312 thereof, is located at or proximate to the front end 436. The tail 404 projects beyond the rear end 438 of the body 402. The tail 404 has a curved, circuitous shape between the proximal end 406 and the distal end 408. For example, the tail 404 curves around similar to a switchback such that although the tail 404 projects rearward beyond the rear end 438 of the body 402, the distal end 408 of the tail 404 may be located between the front end 436 and the rear end 438 (as shown more clearly in FIG. 6). The tail 404 in the illustrated embodiment includes a linear end segment 440 and a curved segment 442. The linear end segment 440 extends to the distal end 408. The curved segment 442 is between the linear end segment 440 and the proximal end 406 of the tail 404. The linear end segment 440 is approximately linear (e.g., less than or equal to 5 degrees or 10 degrees of an angle or curve). The curved segment 442 may extend continuously or may represent multiple curved segments that are spaced apart by linear segments. The curved segment 442 in one or more embodiments may provide an approximately 180 degree transition of the tail 404. For example, the portion of the tail 404 projecting from the rear end 438 may be oriented rearward, and the linear end segment 440 at the distal end 408 may be oriented forward approximately 180 degrees from the portion projecting from the rear end 438. The term "approximately 180 degree" as used herein is intended to include 180 degrees and angled within a tolerance range of 180 degrees, such as plus or minus 5 degrees or 10 degrees of 180 degrees.

The override member 234 according to an embodiment has a unitary, monolithic construction such that the body 402 and the tail 404 are integrally formed as a one-piece unit. The override member 234 may be formed via a molding operation. The body 402 may be a monolithic structure such that the head 434 is integral to the base 432. The override member 234 may be composed of a rigid or semi-rigid polymer material, such as one or more thermoplastics. The tail 404 may be flexible, although resilient to return to a set shape, position, and orientation. The tail 404 may include an optional reinforcement ridge 446 along the curved segment 442 to provide additional support for the tail 404. In an alternative embodiment, the override member 234 does not have a unitary construction such that the tail 404 is discrete from the body 402 and coupled to the body 402 after formation of the discrete parts. In an alternative embodiment, the tail 404 may not be resilient to retain a set shape, position, and orientation, but rather may be a limp strap, cable, cord, string, or the like.

Figure 6:
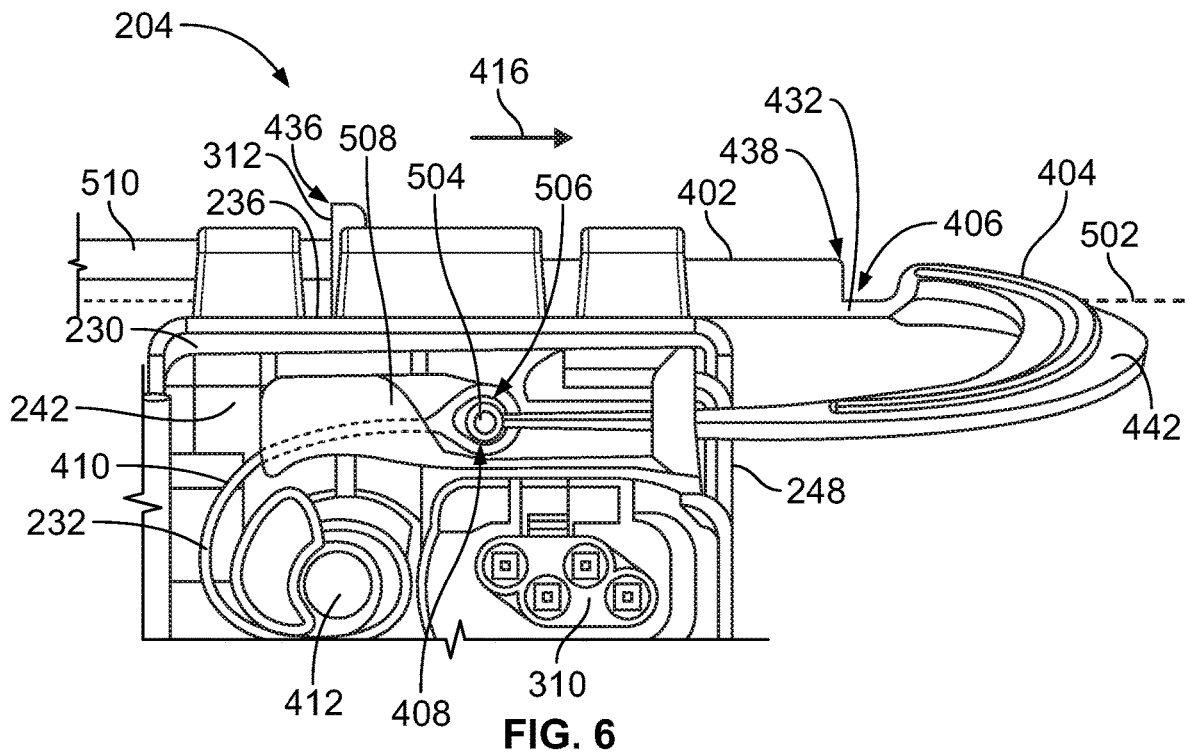
FIG. 6 is a side view of the locking device of the charging assembly according to an embodiment.

FIG. 6 is a side view of the locking device 204 of the charging assembly 110 according to an embodiment. The illustrated side view shows the first edge side 242 of the housing 230. The release member 232 and the electrical connector 310 are disposed along the first edge side 242. In an embodiment, the tail 404 of the override member 234 is not planar such that the distal end 408 is at a different plane than the proximal end 406. For example, the base 432 of the body 402 of the override member 234 may be planar and oriented along a body plane 502. The proximal end 406 of the tail 404 is disposed on the body plane 502, and the curved segment 442 slopes at least slightly inward towards the charging inlet 202 (e.g., downward in the illustrated orientation) out of the body plane 502 such that the distal end 408 is disposed between the charging inlet 202 and the body plane 502. For example, the distal end 408 is disposed between the outer side 236 of the housing 230 and the inner side 238 (shown in FIG. 3). Optionally, the distal end 408 of the tail 404 aligns with the body 402 of the override member 234 such that the distal end 408 is between the front end 436 and the rear end 438 of the body 402.

In the illustrated embodiment, the release member 232 is a coiled strap 410 that is connected to an axle 412. Movement of the strap 410 in the actuation direction 416 causes the axle 412 to rotate, which may release the locking pin 220 (FIG. 3), causing the locking pin 220 to retract. In other embodiments, the release member 232 may be a lever, a pivot arm, a trigger, or the like. In the illustrated embodiment, the distal end 408 of the tail 404 has a bulb 504, and the strap 410 defines a cradle 506 that receives and holds the bulb 504 to couple the override member 234 to the release member 232. A portion of the strap 410 behind a guide wall 508 of the housing 230 is shown in phantom in FIG. 6.

FIG. 6 shows a portion of an external instrument 510 engaging the contact surface 312 of the override member 234. The external instrument 510 may be a screwdriver, a key, an Allen wrench, or another device that has a narrow, elongated probe. The external instrument 510 forces the override member 234 to move in the actuation direction 416 such that the contact surface 312 moves towards the rear side 248 of the housing 230. Therefore, the override member 234 translates rearward in the direction 416 towards the displaced position responsive to the force provided by the instrument 510. The distal end 408 of the override member 234 actuates the release member 232 by pulling the strap 410 rearward in the direction 416. The pulling of the strap 410 causes the axle 412 to rotate clockwise, causing the locking pin 220 (FIG. 3) to retract. In an embodiment, after manually overriding to move the locking pin 220 to the retracted position and after removing the external instrument 510, the release member 232 may be configured to pull the override member 234 in an opposite direction back towards the initial resting position. For example, the electrical actuator 306 or another internal mechanism may cause the axle 412 to rotate counter-clockwise, which pulls the override member 234, via the tail 404, forward towards the resting position.

Figure 7:
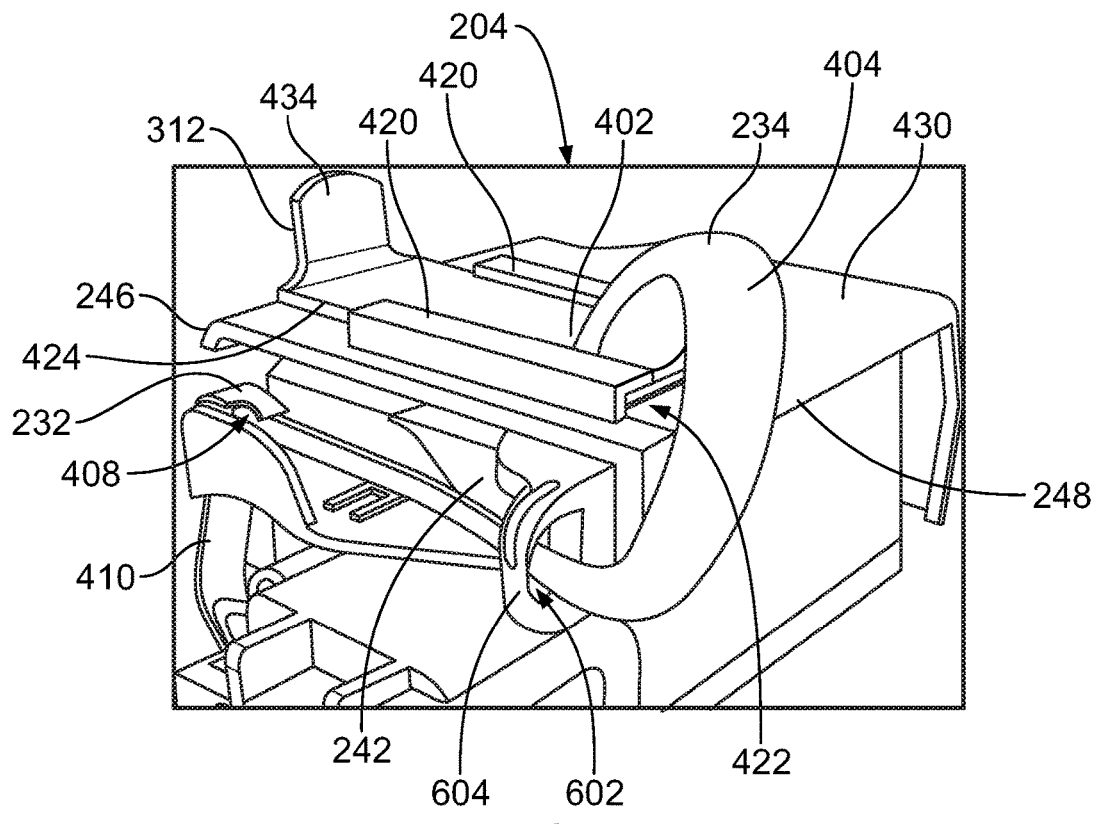
FIG. 7 is a rear perspective view of the locking device of the charging assembly according to an alternative embodiment showing the override member in an initial resting position.
Figure 8:
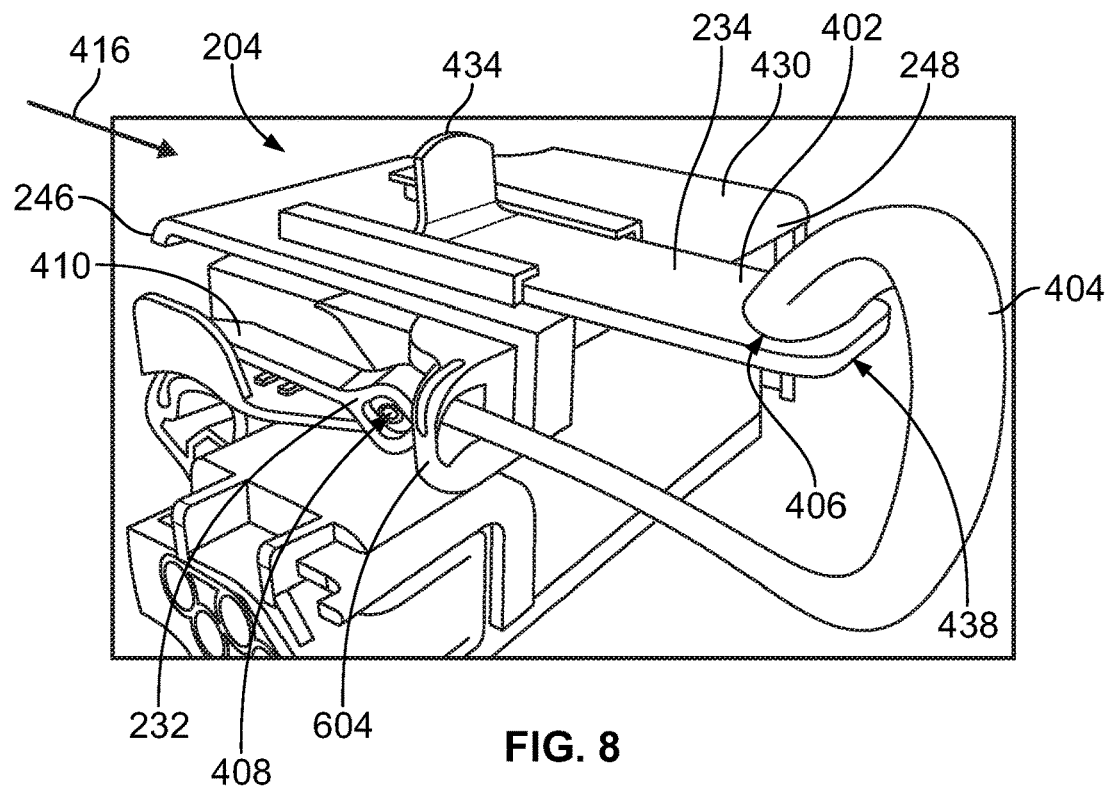
FIG. 8 is a rear perspective view of the locking device shown in FIG. 7 showing the override member in a displaced position.

FIG. 7 is a rear perspective view of the locking device 204 of the charging assembly 110 according to an alternative embodiment showing the override member 234 in the initial resting position. FIG. 8 is a rear perspective view of the locking device 204 shown in FIG. 7 showing the override member 234 in the displaced position. The embodiment shown in FIGS. 7 and 8 is similar to the embodiment shown in FIGS. 2, 3, 5, and 6 except for a few minor feature modifications. For example, the body 402 of the override member 234 in FIGS. 7 and 8 does not have a raised lip along the elongated edges 424. The guide features 420 of the housing 230 define guide channels 422 to receive the elongated edges 424 for mounting the override member 234 to the housing 230 and permitting bi-directional translation of the override member 234 relative to the housing 230, but the guide features 420 are modified from the guide features 420 shown in FIGS. 3 and 5. In addition, the tail 404 of the override member 234 still projects beyond the rear end 438 of the body 402, but in FIGS. 7 and 8 the proximal end 406 of the tail 404 is spaced apart from the rear end 438 of the body 402.

As shown in FIG. 7, when the override member 234 is in the initial resting position, the head 434 that defines the contact surface 312 is disposed at or proximate to the front side 246 of the housing 230, and no part of the body 402 projects beyond the rear side 248 of the housing 230. But, when translated to the displaced position as shown in FIG. 8, the head 434 is spaced apart from the front side 246 and a segment of the body 402 projects beyond the rear side 248 of the housing 230.

The tail 404 may extend through an eyelet 602 in an appendage 604 of the housing 230 that is disposed along the first edge side 242. The appendage 604 is located at or proximate to the rear side 248. In the initial resting position shown in FIG. 7, the distal end 408 of the tail 404 and the release member 232 (e.g., strap 410) are located at or proximate to the front side 246 and spaced apart from the appendage 604. In the displaced position shown in FIG. 8, the distal end 408 of the tail 404 and the release member 232 are located at or proximate to the appendage 604. For example, engagement between the release member 232 and/or the distal end 408 with the appendage 604 may block additional movement of the override member 234 in the actuation direction 416. Thus, the override member 234 may achieve the displaced position upon the release member 232 and/or distal end 408 abutting the appendage 604.

Figure 9:
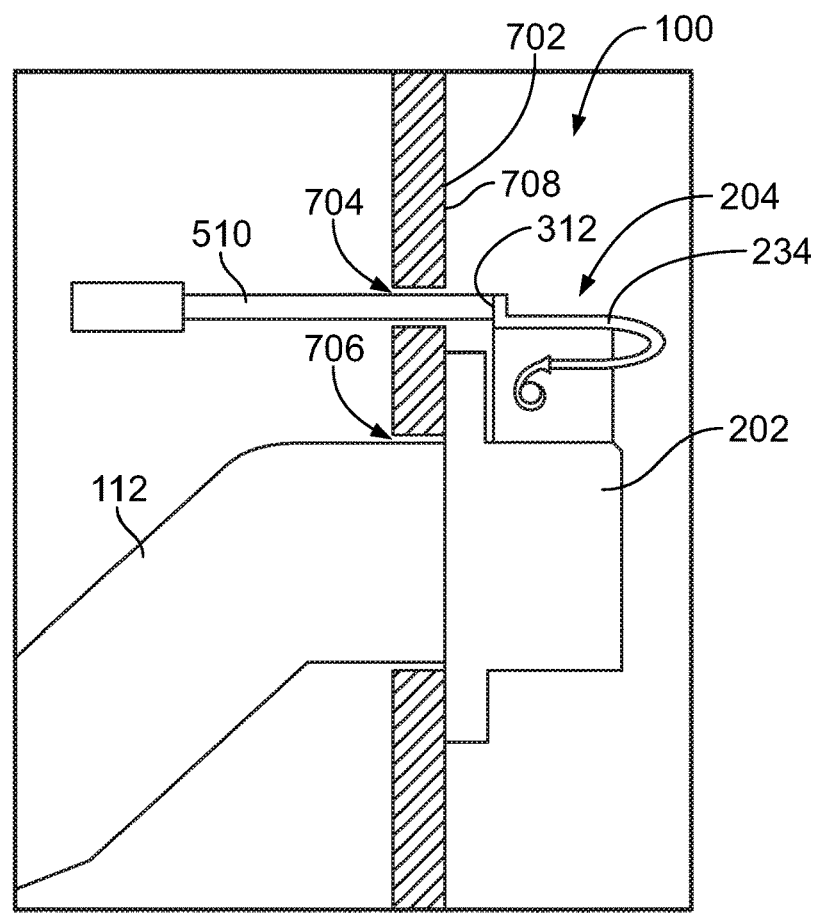
FIG. 9 is a cross-sectional illustration of the charging assembly according to an embodiment.

FIG. 9 is a cross-sectional illustration of the charging assembly 110 according to an embodiment. The charging assembly 110 includes the charging inlet 202, the locking device 204, and a panel 702. The panel 702 may be a panel within a vehicle, such as a portion of a chassis, a body panel, a wall of a device housing, or the like. The panel 702 defines an access port 704. The panel 702 also defines a charging port 706. The mating connector 112 mates to the charging inlet 202 through the charging port 706. The charging inlet 202 and the locking device 204 are disposed along an interior of the panel 702. For example, the charging inlet 202 may be mounted to an inner side 708 of the panel 702, or may be mounted to another structure but located along the inner side 708. The contact surface 312 of the override member 234 aligns with the access port 704. The external instrument 510 is inserted through the access port 704 from exterior of the panel 702 in order to engage the contact surface 312 to translate the override member 234 for mechanically overriding the electrical actuator 306 (FIG. 3). The access port 704 may be accessible from outside of the vehicle by lifting or removing a lid or cover (not shown).

At least one technical effect of the charging assembly 110 described herein is ability to mechanically retract a locking pin via using a probe-like instrument located proximate to a charging inlet of the vehicle. The charging assembly 110 does not require routing a cable remotely away from the charging inlet 202 through various compartments and panels of the vehicle. The charging assembly 110 does not require providing a designated handle and a designated handle area within a passenger compartment of the vehicle specifically for manually overriding the locking pin. At least one technical effect of the charging assembly 110 may be reduced complexity in the mechanical override assembly relative to known mechanical override assemblies, which may reduce construction and maintenance costs and improve reliability.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. Dimensions, types of materials, orientations of the various components, and the number and positions of the various components described herein are intended to define parameters of certain embodiments, and are by no means limiting and are merely example embodiments. Many other embodiments and modifications within the spirit and scope of the claims will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A charging assembly comprising:
  a charging inlet configured to releasably couple to a mating connector of an external power source to recharge a battery; and
  a locking device mounted to the charging inlet, the locking device comprising:
    a housing;
    a release member mounted to the housing and connected to a locking pin via a mechanical linkage, the locking pin being movable between an extended position and a retracted position, the locking pin in the extended position configured to secure the mating connector to the charging inlet; and
    an override member slidably mounted to the housing, the override member having a body and a tail that extends from the body, the tail coupled to the release member, the body having a contact surface configured to be engaged by an external instrument to translate the override member in a rearward direction relative to the housing such that the tail actuates the release member by pulling the release member in the rearward direction, the actuation of the release member causing the locking pin to transition from the extended position towards the retracted position to enable the mating connector to be disconnected from the charging inlet.

2. The charging assembly of claim 1, wherein the housing has an inner side that faces the charging port and an outer side that faces away from the charging port, the override member mounted to the outer side of the housing, the release member mounted along a first edge side of the housing that extends from the inner side to the outer side.

3. The charging assembly of claim 1, wherein the body includes a base and a head that extends upright from the base and defines the contact surface.

4. The charging assembly of claim 1, wherein the body includes a front end and a rear end opposite the front end, wherein the contact surface is located at the front end and the tail projects beyond the rear end.

5. The charging assembly of claim 1, wherein the locking device further includes an electrical actuator that is configured to move the locking pin between the extended and retracted positions based on electrical control signals, wherein the override member mechanically overrides the electrical actuator to move the locking pin towards the retracted position.

6. The charging assembly of claim 1, wherein the tail has a circuitous shape and includes a linear end segment at a distal end of the tail and a curved segment between the linear end segment and a proximate end of the tail at the body.

7. The charging assembly of claim 6, wherein the curved segment provides an approximately 180 degree transition.

8. The charging assembly of claim 1, wherein the body has a base that is planar along a body plane, and the tail is non-planar and extends out of the body plane.

9. The charging assembly of claim 1, wherein the body of the override member has a raised lip at each of a first elongated edge of the override member and a second elongated edge of the override member that is opposite the first elongated edge, the raised lips received within guide channels of the housing to retain the override member on the housing and to restrict movement of the override member relative to the housing to bidirectional translation along a longitudinal axis.

10. The charging assembly of claim 1, wherein the charging inlet is mounted interior of a panel of a vehicle and the contact surface of the override member aligns with an access port defined through the panel, wherein the contact surface is accessible from exterior of the panel by inserting the external instrument through the access port.

11. A locking device comprising:
  a housing;
  a release member mounted to the housing and connected to a locking pin via a mechanical linkage, the locking pin being movable between an extended position and a retracted position;
  an electrical actuator connected to the locking pin and configured to move the locking pin between the extended and retracted positions based on electrical control signals; and
  an override member slidably mounted to the housing, the override member having a body and a tail that extends from the body, wherein the tail is curved along a length of the tail and is coupled to the release member, the body having a contact surface configured to be engaged by an external instrument to translate the override member relative to the housing along a longitudinal axis such that the tail actuates the release member causing the locking pin to transition from the extended position towards the retracted position, overriding the electrical actuator.

12. The locking device of claim 11, wherein the body of the override member includes a front end and a rear end opposite the front end, wherein the contact surface is located at the front end and the tail projects beyond the rear end.

13. The locking device of claim 11, wherein the housing has an outer side and an inner side that is opposite the outer side, wherein the override member is mounted to the outer side of the housing and the release member is mounted along a first edge side of the housing that extends from the inner side to the outer side, wherein the tail extends out of a plane of the body to couple to the release member.

14. The locking device of claim 11, wherein the housing has a front side and a rear side opposite the front side, the tail of the override member extending rearward from the release member, wherein the override member is configured to translate rearward along the longitudinal axis responsive to engagement by the external instrument on the contact surface such that the tail pulls the release member rearward to actuate the release member.

15. The locking device of claim 11, wherein the tail has a circuitous shape and includes a linear end segment at a distal end of the tail and a curved segment between the linear end segment and a proximate end of the tail at the body.

16. The locking device of claim 11, wherein the body of the override member has a raised lip at each of a first elongated edge of the override member and a second elongated edge of the override member that is opposite the first elongated edge, the raised lips received within guide channels of the housing to retain the override member on the housing and to restrict movement of the override member relative to the housing to bidirectional translation along the longitudinal axis.

17. The locking device of claim 16, wherein the body of the override member includes a front end and a rear end opposite the front end, wherein the curved segment provides an approximately 180 degree transition and a distal end of the tail aligns between the front end and the rear end of the body.

18. A charging assembly comprising:
a panel defining an access port;
a charging inlet configured to releasably couple to a mating connector of an external power source to recharge a battery of a vehicle, the charging inlet mounted to the vehicle along an interior of the panel; and
a locking device mounted to the charging inlet interior of the panel, the locking device comprising:
  a release member connected to a locking pin via a mechanical linkage, the locking pin being movable between an extended position and a retracted position, the locking pin in the extended position configured to secure the mating connector to the charging inlet; and
  an override member having a body and a tail that extends from the body, the tail coupled to the release member, the body having a contact surface that aligns with the access port in the panel and is configured to be engaged by an external instrument from an exterior of the panel by insertion of the external instrument through the access port,
wherein, due to the engagement by the external instrument on the contact surface, the override member is configured to translate relative to the charging inlet such that the tail actuates the release member causing the locking pin to transition from the extended position towards the retracted position to enable the mating connector to be disconnected from the charging inlet.

19. The charging assembly of claim 18, wherein the locking device includes a housing having an inner side that faces the charging port and an outer side that faces away from the charging port, wherein the override member is slidably mounted to the outer side of the housing such that the override member is bi-directionally translatable along a longitudinal axis.

20. The charging assembly of claim 18, wherein the tail has a circuitous shape and includes a linear end segment and a curved segment, the curved segment disposed between the linear end segment and the body of the override member.

* * * * *